A. J. HILGER AND R. URCHNIAK.
VEHICLE SIGNALING DEVICE.
APPLICATION FILED JAN. 14, 1916.
1,338,078.
Patented Apr. 27, 1920.
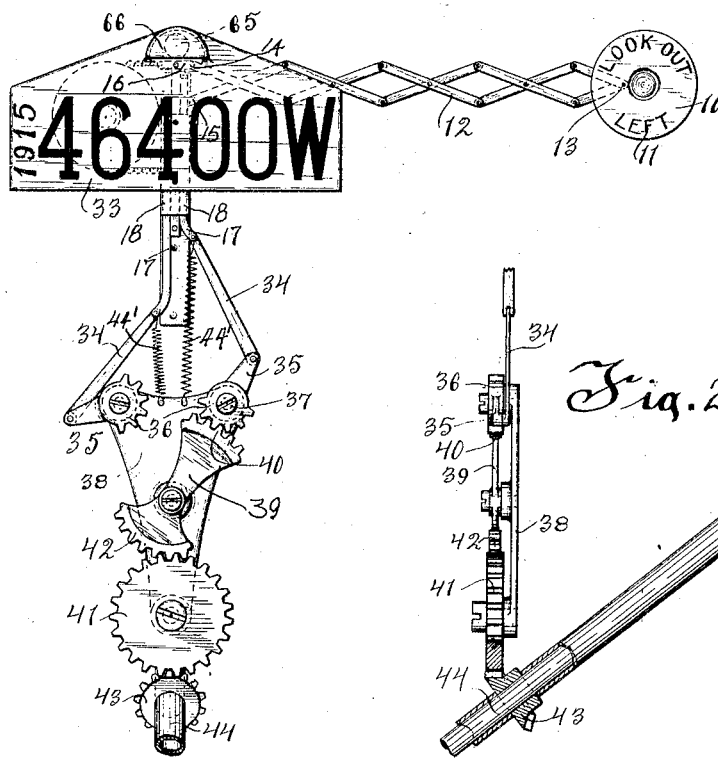

UNITED STATES PATENT OFFICE.

ANTHONEY J. HILGER, OF MILWAUKEE, AND RUDOLPH URCHNIAK, OF WEST ALLIS, WISCONSIN.

VEHICLE SIGNALING DEVICE.

1,338,078.  Specification of Letters Patent.  Patented Apr. 27, 1920.

Application filed January 14, 1916. Serial No. 72,020.

*To all whom it may concern:*

Be it known that we, ANTHONEY J. HILGER, citizen of the United States, resident of Milwaukee, Milwaukee county, Wis., and RU-DOLPH URCHNIAK, a subject of the Emperor of Austria, and resident of West Allis, Milwaukee county, Wis., have invented new and useful Improvements in Vehicle Signaling Devices, of which the following is a description, reference being had to the accompanying drawings, which are a part of this specification.

The invention relates to operating mechanisms for signaling devices.

The invention designs more particularly to provide a signaling device for a vehicle to permit the driver of the vehicle to indicate in which direction he intends to turn so as to insure safety of machines or persons in front or behind the vehicle.

The invention further designs to provide a vehicle signaling device consisting of extensible semaphore arms provided with direction indicators which arms may be extended outwardly to indicate whether the driver of the vehicle is to turn to the right or left, and means are provided for displaying the signals on the semaphore arms at night.

The invention further designs to provide a signaling apparatus of the type above described which may be used either at the front or rear of the vehicle and which may be operated mechanically either by hand or foot control, or from the steering wheel of the vehicle, or which may be electrically operated.

With the above and other objects in view, which will appear as the description proceeds, our invention resides in the novel construction, combination and arrangement of parts substantially as hereinafter described, it being understood that such changes in the precise embodiment of the herein disclosed invention may be made as come within the scope of the claim.

In the accompanying drawing, we have illustrated one complete example of the physical embodiment of our invention constructed according to the best mode we have so far devised for the practical application of the principles thereof, and in which:

Figure 1 is a detail view of the device, showing mechanism for operating it from the steering wheel of the vehicle, and

Fig. 2 is a detail view of the mechanism shown in Fig. 1, parts being broken away and parts being shown in section.

In general, the device comprises a pair of extensible indicator-carrying arms, means for operating said arms, means for illuminating said direction indicators, a number plate carried by the device, means for illuminating the number of the plate, and an audible signal adapted to be operated simultaneously or independently with the operation of the visible signal.

The semaphore-carrying arms each comprises a disk 10 provided with suitable designations 11 forming a direction indicator to show in which direction the vehicle is to turn, and a system of lazy tongs 12 pivotally connected at their outer ends 13 to the disk 10 and pivotally connected together at their inner ends 14 and 15 to a support 16 and a slidable rod 17, respectively. The lazy tongs constitute a foldable extension means for supporting and moving the indicators.

The means for operating the semaphore arms of the visible direction indicators comprises means for operating the slidable rods 17 to move the lazy tongs inwardly to folded position, as shown at the left in Fig. 1, or outwardly to extended position, as shown at the right in Fig. 1. The rods 17 for each of the lazy tongs are slidably mounted in guides 18 formed in the support 16 and are adapted to be operated by the turning of the steering wheel. This means for operating the semaphore arms consists, for each arm, of a link 34 pivotally connected at the lower end of the slidable rod 17 and pivotally connected to a crank 35 which carries a segmental gear 36 on a stud shaft 37 secured in a suitable support 38 which is mounted on the vehicle. A member 39 journaled on a shaft in the support 38 is provided with a segmental gear portion 40 which is adapted to mesh with either of the segmental gears 36 and means are provided for rotating the member 39 from the steering wheel. This means consists of a gear 41 rotatably mounted on the support 38 and in mesh with a segmental gear portion 42 on the member 39 and with a bevel gear 43 mounted on the steering shaft 44. Resultantly the rotation of the steering shaft will, through the gears 43, 41 and 42, oscillate the member 39 which, through the gear 40 and the gear 36, crank 35 and link 34, will move the rod 17 upwardly to display the signal desired. The gear 40 may be brought into mesh with either of the gears 36 or to neutral position in which case the retractile springs 44' secured to the support 38 and the rods 17 return the tongs and the indicators to inoperative position.

The plate 33 with designating characters thereon, such as the number of the vehicle, is carried by the support 16, as previously described, and a lamp 65 is disposed beneath the hood 66 to throw the light on the designations on the plate. This lamp is in circuit with a battery not shown through suitable conductors not shown, and a switch, not shown, is used to open and close the circuit through the lamp.

The invention thus exemplifies a signaling device in which right and left hand indicators are carried on extensible foldable means whereby the indicator may be moved outwardly into operative position for warning or may be returned to inoperative position behind the number plate of the vehicle and in which means are provided for illuminating the indicators simultaneously or independently with the operation of an audible signal.

What we claim as our invention is:—

In a device of the class described, the combination, with direction indicators, of means for moving said indicators into and out of display position including slidable rods, cranked shafts, a link connecting each rod with one of said shafts, means for moving either of said shafts independently comprising a mutilated gear on each shaft, a segmental gear adapted to be moved into or out of mesh with either of said mutilated gears, and means for turning said segmental gear.

In testimony whereof, we affix our signatures.

ANTHONEY J. HILGER.
RUDOLPH URCHNIAK.